United States Patent

Lamb et al.

[15] 3,651,450
[45] Mar. 21, 1972

[54] RECORDING SYSTEM FOR SEISMIC SIGNALS

[72] Inventors: Thomas W. Lamb; Robert E. Lee; William C. Montgomery, Jr., all of Houston; William R. Orr, Bellaire; Charles B. Vogel, Houston, all of Tex.

[73] Assignee: Shell Oil Company, New York, N.Y.

[22] Filed: Oct. 20, 1969

[21] Appl. No.: 867,523

[52] U.S. Cl. ............................................. 340/15.5
[51] Int. Cl. ............................................. G01v 1/28
[58] Field of Search .................... 340/15.5; 181/.5

[56] References Cited

UNITED STATES PATENTS

| | | | |
|---|---|---|---|
| 3,075,607 | 1/1963 | Aitren et al. | 181/.5 |
| 3,134,957 | 4/1964 | Foote et al. | 340/15.5 |
| 3,241,100 | 3/1966 | Loofbourrow | 340/15.5 |
| 3,292,141 | 12/1966 | Hines et al. | 340/7 |
| 3,323,105 | 5/1967 | Citarske | 340/15.5 |
| 3,440,599 | 4/1969 | Waters et al. | 340/15.5 |

Primary Examiner—Rodney D. Bennett, Jr.
Assistant Examiner—N. Moskowitz
Attorney—J. H. McCarthy and Theodore E. Bieber

[57] ABSTRACT

A recording system adapted to digitally record the data from a large number of geophones wherein the geophones are divided into subgroups with the data from each subgroup being multiplexed with a local clock signal and transmitted to a central recording station where it is partially demultiplexed, stretched in time, and recorded.

10 Claims, 7 Drawing Figures

INVENTORS:
T. W. LAMB
R. E. LEE
W. C. MONTGOMERY, JR.
W. R. ORR
C. B. VOGEL

INVENTORS:
T. W. LAMB
R. E. LEE
W. C. MONTGOMERY, JR.
W. R. ORR
C. B. VOGEL

INVENTORS:
T. W. LAMB
R. E. LEE
W. C. MONTGOMERY, JR.
W. R. ORR
C. B. VOGEL

INVENTORS:
T. W. LAMB
R. E. LEE
W. C. MONTGOMERY, JR.
W. R. ORR
C. B. VOGEL

RECORDING SYSTEM FOR SEISMIC SIGNALS

BACKGROUND OF THE INVENTION

The present invention relates to the recording of signals from a large number of geophones, for example, 1,000 or more geophones in response to a single seismic disturbance. The disturbance, of course, can be repeated and the signals from the geophones recorded for each individual disturbance. The mere multiplying of known systems to handle a large number of geophone signals is impractical, since the equipment would be too big to handle in a practical manner. Further, by multiplying individual systems one would obtain individual recordings and they would have to be synchronized during processing so that the data from all geophones could be utilized in a single display or composite. This is particularly true in the case of digitally recorded data where each recorder for a particular group of geophones would be responsive to a particular local clock signal that may or may not be the same as the local clock of a second recorder. Thus, in addition to separate recordings one would have different time basis that would make further processing extremely difficult. In view of these problems, it is obvious that the mere multiplications of known systems to handle a larger number of geophones, while theoretically possible is a practical impossibility.

At the present time there is a great interest in the recording of signals of a large number of geophones in response to a single seismic disturbance, particularly in the case of holography where it is desirable to obtain data from a large number of geophones to permit the development of a three-dimensional display of the volume of the earth being surveyed. Additional use can be made of the data from a large number of geophones to provide a more detailed geological record of areas that have been particularly difficult to decipher geologically. Also, the data from a large number of geophones permits the stacking or combining of the data to improve the signal-to-noise ratio.

Further, if the use of a large number of geophones, for example a thousand or more geophones, is to have real value in the search for petroleum deposits, it should be relatively economical to use. In order to be economical the system must be relatively low in initial cost on a per geophone basis as well as present the recorded data in a form that can be readily handled by available data processing equipment. At the present time the most satisfactory way of recording geophone signals is in a digital form and then digitally processing the data. As explained, in order for the data to be easily processed, it should all be recorded with reference to the same clock signal. Further, if practical, the data should all be recorded on a single tape and not multiple tapes which must be processed simultaneously or individually and then the data collected into a single form for presentation. If presently available equipment was merely multiplied to handle a large number of geophones, the overall cost of the system would be prohibitive and the data would be recorded in a form that would make processing extremely difficult.

SUMMARY OF THE INVENTION

The present invention solves the above problems by providing a recording system that is capable of handling a thousand or more geophones and recording the geophone signals on a single magnetic tape. The system divides the geophones into subgroups and converts the received geophone signals into digital signals at each subgroup station and then transmits the individual digital signals to a central recording system. For example, the geophones could be divided into subgroups of 96 geophones, each group of 96 being processed by a single substation. Each substation receives the individual analog geophone signals and converts them to a digital signal, preferably using a gain-ranging amplifier in combination with an analog-to-digital converter. The digital signal is then combined with the local clock signal used to control the operation of the gain-ranging amplifier. The combined signal is known as a self-clocking digital signal. The self-clocking digital signal is then transmitted to the central recording system via a single coaxial cable. For example, 96 geophones in a subgroup could be divided into three strings of 32 geophones each, with the gain-ranging amplifier being programmed to sample the first geophone in each string and then sample the second and so forth until all geophone signals had been sample, at which point the sampling procedure would be repeated.

At the central recording station, the self-clocking digital signal from each substation is partially demultiplexed to provide three separate signals in which the signals from each individual strong of 32 geophones are collected. The individual signals are then stretched in time and recorded preferably on magnetic tape. The partial demultiplexing and time stretching of the signals is an important feature of the present invention, since it permits the digital data from each substation to be transmitted at a rapid rate and then converted to a form that can be recorded on magnetic tape using presently available techniques. For example, it is possible to transmit $1 \times 10^6$ bits per second over one mile of coaxial cable but practical recording techniques are only capable of handling one-third of this amount on each track. By partially demultiplexing the data and stretching it in time it is possible to record the signals from 32 geophones of each string on a single track on a magnetic tape. Thus, the tape will require three tracks to record all the data from 96 geophones.

The partial demultiplexing also separates the clock signal of each local subgroup and transmits the clock pulse to a tape transport control and also to the computer that controls the recording of the data on the tape. Thus, the data from each individual subgroup of geophones can be recorded on the same time base even though the original local clocks vary slightly.

BRIEF DESCRIPTION OF THE DRAWINGS

The present invention will be more easily understood from the following detailed description of a preferred embodiment when taken in conjunction with the attached drawings in which.

PREFERRED EMBODIMENT

Figure 1:
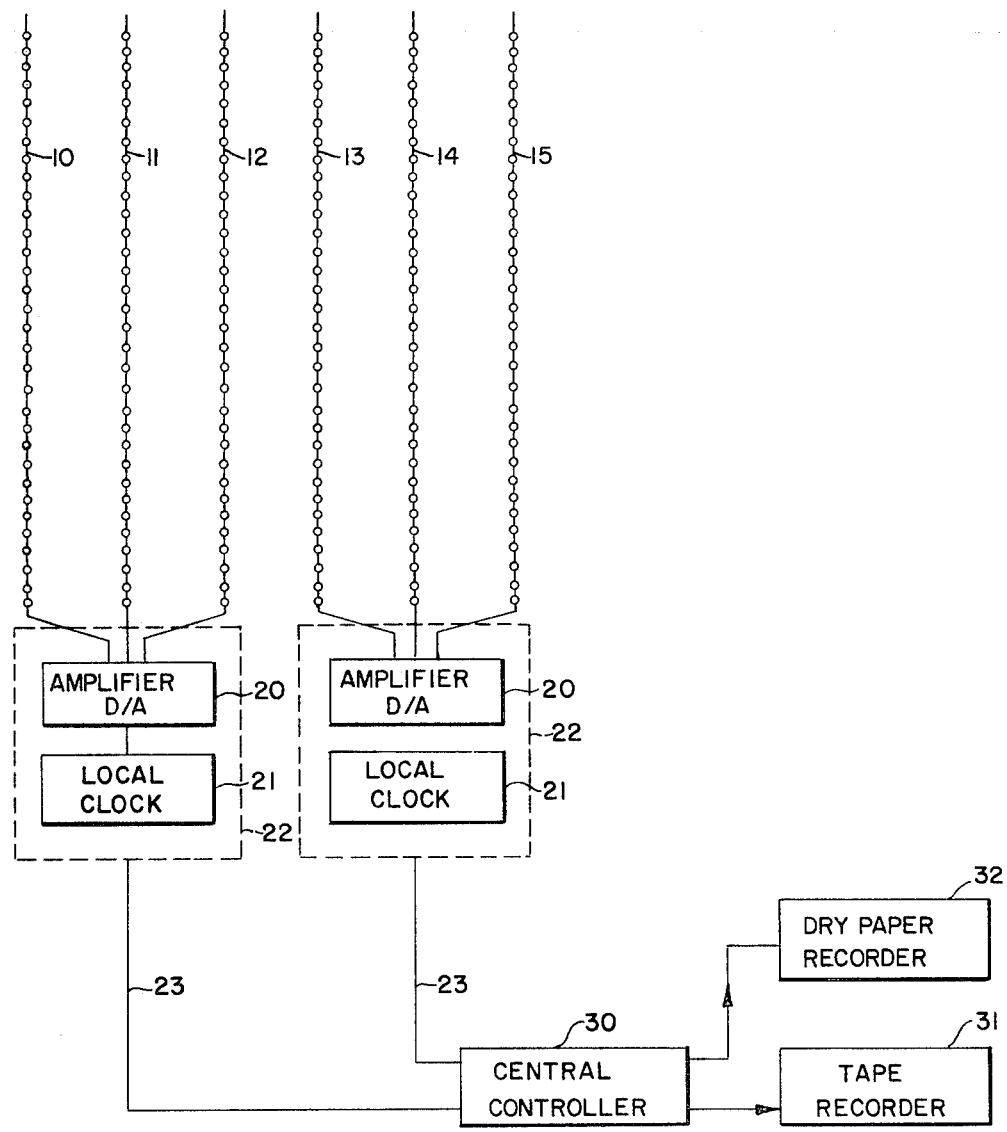
FIG. 1 is a block diagram of the complete system showing two substations.

Referring now to FIG. 1, there is shown a simplified circuit for the complete recording system having two substations. The system can be expanded to 11 substations and still remain within the present ability of available recording equipment. Also, of course, it is possible to use a single substation and record the data directly at the substation. Thus, the individual substations can be used to perform conventional seismic surveys while a large group of the substations can then be assembled with a central recording system to perform a survey requiring more extensive coverage.

As shown in FIG. 1, the geophones are divided into individual spreads 10–15, each containing 32 geophones as shown. Of course, the geophones could be disposed in other types of spreads than the straight line shown in FIG. 1 and different numbers of geophones could be disposed in individual spreads. The present arrangement of 32 geophones in each spread and three spreads comprising each subgroup provides a system wherein the signal from each geophone can be sampled once every 2 milliseconds and still maintain the data within the recording capabilities of presently available equipment.

Also, 96 geophones comprise a normal seismic survey crew and provide sufficient coverage in routine seismic surveys. Thus, substations having 96 geophones are useful in and of themselves. The three spreads of geophones of each substation are coupled to an amplifier and digital-to-analog converter 20. The amplifier 20 preferably comprises a gain-ranging amplifier wherein the gain of the amplifier is continually changed as the amplitude of the geophone signal varies. Further, the gain-ranging amplifier should include the circuits required to sample each geophone in the three spreads in a predetermined sequence. Preferably, the amplifier would sample the first geophone in spread 10 and the first geophone in the spread 11 and the first geophone in the spread 12 at which point it would then move to the second geophone in the spread 10 and continue on until all 32 geophones in each spread were sampled. At this point the amplifier would then repeat the sampling routine and continue on in the same sequence. Each of the substations also includes a local clock 21 that controls the sampling rate of the gain-ranging amplifier and provides a time base for the recorded digital data. Each of the substations is coupled by means of a single coaxial cable 23 to a central controller 30 where the data is partially demultiplexed and prepared in a form for recording. More particularly, the data is partially demultiplexed to rearrange the geophone signals into three individual trains of data pulses each of which contain the data from one of the three spreads connected to the substation. Also, the clock signal is separated from the multiplexed signal and supplied as a separate signal. The signal from the controller is supplied to a dry paper type recorder 32 and to a magnetic tape recorder 31. The signal supplied to the tape recorder can be in digital form, but of course, the signals supplied to the dry paper recorder is in the form of an analog signal. The dry paper recorder serves the purpose of monitoring the seismic signals to ascertain whether any particular seismic shot should be repeated prior to moving to the next location.

Figure 2:
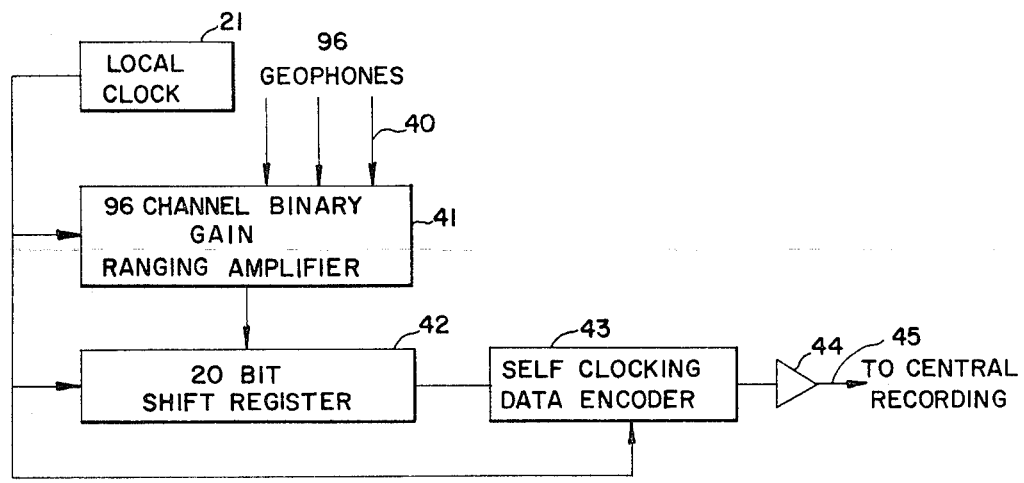
FIG. 2 is a block diagram of the components used at each substation.

Referring now to FIG. 2, there is shown a detailed block diagram of the circuits used in each of the substations shown in FIG. 1. More particularly, there is illustrated a binary gain-ranging amplifier 41 containing 96 individual channels, a separate channel being provided for each geophone in the spread. The binary gain-ranging amplifier is more particularly described and claimed in a copending application entitled "Gain Ranging Amplifier," filed on Oct. 9, 1969, Ser. No. 864,998. A local clock 21 supplies pulses to both the binary gain-ranging amplifier and the parallel entry/serial shift register 42 and the self-clocking data encoder 43 in order that all components of the substation may be synchronized to the same time base. The binary gain-ranging amplifier is coupled to an analog-to-digital converter which converts the analog signal to a 20 bit digital word which is then supplied to a shift register 42. The serial output of the shaft register 42 is connected to the self-clocking data encoder 43 which combines or multiplexes the twenty bit digital word with the local clock signal 21 and supplies a single self-clocked output signal. This signal is amplified by an amplifier 44 and transmitted over the coaxial cable 45 to the central recording station. The amplifier 44 is used basically as a driver to match the impedance of the signal source to the impedance of the coaxial cable to insure optimum transmission.

Figure 3:
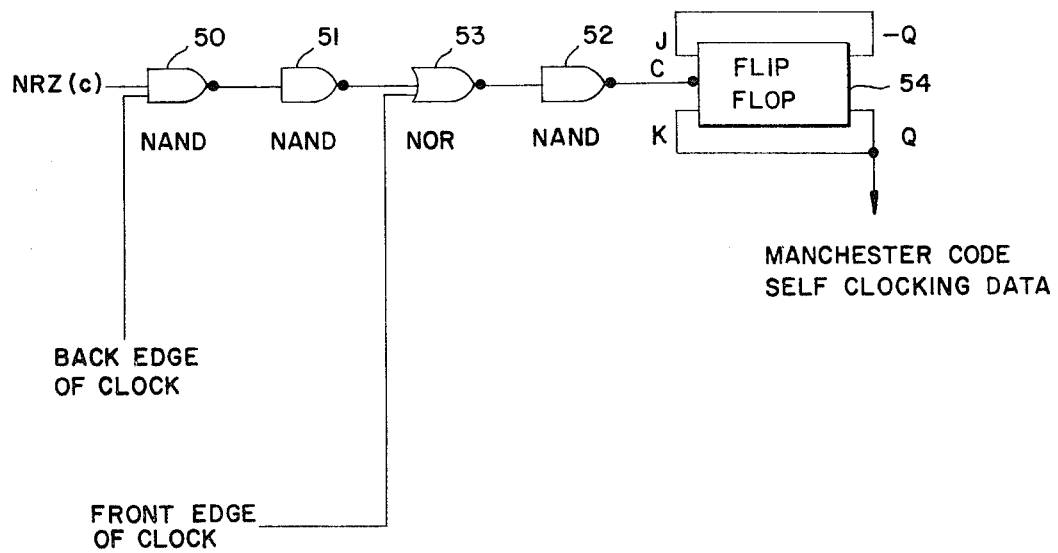
FIG. 3 is a block diagram of the circuit for combining the data code with the local clock pulse signals.

Referring to FIG. 3, there is shown a diagram of a self-clocking data encoder. This circuit combines the clock and the NRZ code data (nonreturn to zero) from the binary gain ranging amplifier into a single wave train in a manner well known to those skilled in the art. In this particular example, the Manchester code is sued. Other self-clocking data codes, such as the Miller Code, could also be used. The identifying breaks, or space bits, between words are produced by gapping the clock at the end of each word. These space bits are very useful for data manipulation.

The circuit of FIG. 3 comprises three serially connected NAND circuits 50–52 and a single NOR circuit 53. The NRZ code is supplied as one input to the NAND circuit 50, the back edge of the clock pulse is supplied as the other input to circuit 50 and the front edge is supplied to the NOR circuit 53. The output of the NAND circuit 52 is supplied to a set-reset flip-flop 54 whose outputs are coupled to the remaining inputs so that the circuit changes state for every input signal.

Figure 4:
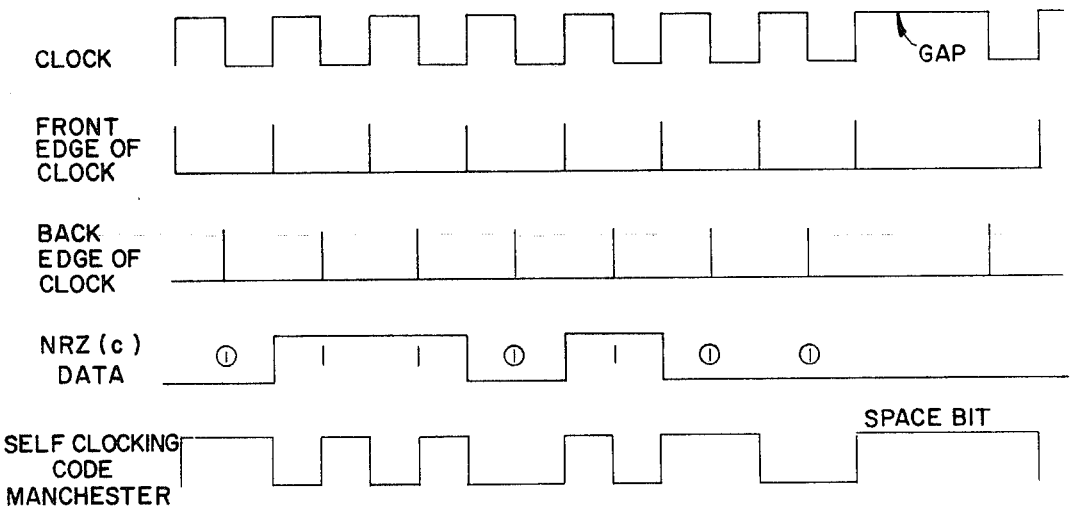
FIG. 4 is a series of wave forms showing how the data code and the local clock pulses are combined.

Referring now to FIG. 4, there is shown a series of waveforms illustrating how the clock pulses and NRZ code are combined to provide the self-clocking Manchester code. The Manchester code changes on the front and back edges of each clock pulse to indicate an NRZ code one and changes on the front edge only of each clock pulse to indicate an NRZ code zero. The circuit of FIG. 3 produces this result by passing the front edge of each clock pulse while passing the back edge of the clock pulse only when that back edge coincides with one of the NRZ data signals. The flip-flop converts the pulse signals to square wave signals that form the Manchester code.

During field operations, the separation between substation trucks and the central recording truck may vary from a few feet up to 5,000 feet. The self-clocking, one megabit per second, data code undergoes various types of distortion during traversal of the coaxial cable, and it must be "reconstructed" at the receiving end of the cable. Reconstruction of the self-clocking data should preferably be done automatically so that no manual adjustments are necessary when the coaxial cable length is changed.

Figure 5:
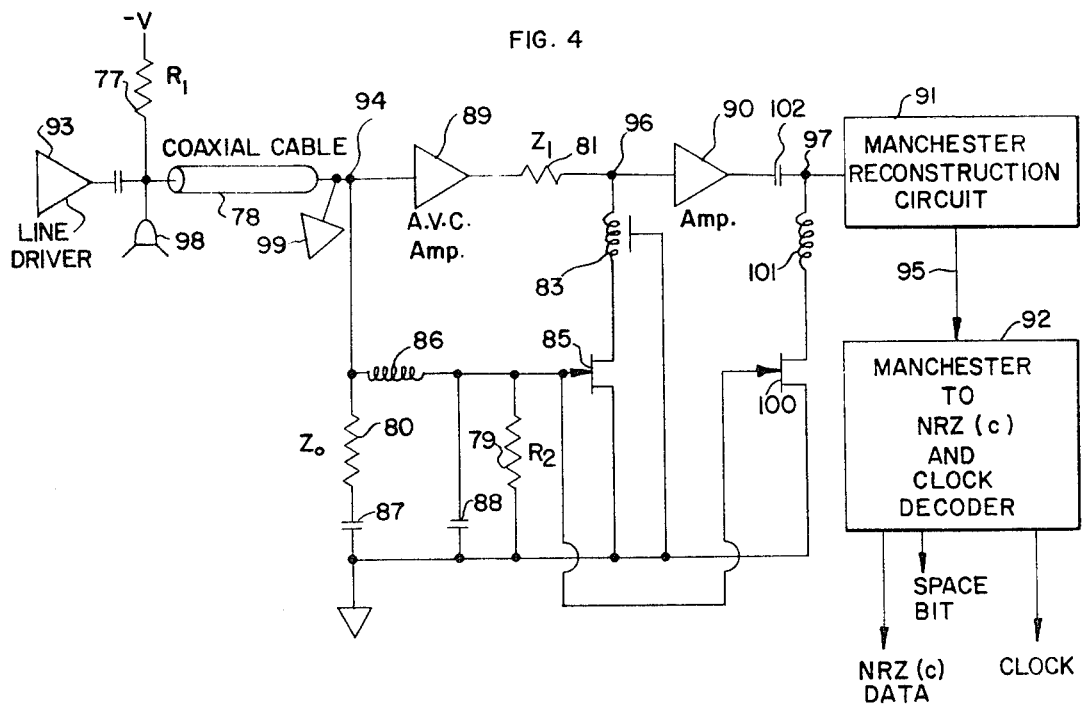
FIG. 5 is a block diagram of a portion of the central recording system.

Referring to FIG. 5, it is a diagram of a circuit used for automatic line equalization and Manchester data reconstruction. Using this circuit at one million bits per second, coaxial cable length between zero and 5000 feet may be used without requiring manual adjustments. As shown in FIG. 5, 93 is a line driver for driving the coaxial cable 78. The cable is terminated on the receiving end in its characteristic impedance 80 and in a capacitor 87. Resistor 77, the coaxial cable 78, the radio frequency choke 86, and resistor 79 comprise a voltage divider circuit. Capacitors 87 and 88, along with resistor 80 and radio frequency choke 86, comprise a filter to separate the DC control signal. Thus, the negative voltage at the gate electrode of the field effect transistor 85 varies inversely as the coaxial cable length due to voltage divider action of 77, 78, 86 and 79. The field effect transistor 86 provides a resistive termination for the delay line 83. The receiving end of the coaxial cable 94 is connected to an automatic volume control amplifier 89 which drives delay line 83 through its characteristic impedance 81. The amplifier 89 provides a constant amplitude data signal of about 0.2 volt to the impedance 81, the delay line 83, and the field effect transistor 85. A small signal, such as 0.2 volt, is necessary so that the field effect transistor 85 operates in its linear and resistive range.

Impedance 81, delay line 83, and field effect transistor 85, comprise an automatically adjusted equalization filter which provides a flat frequency response for data transmission for all cable length up to 5,000 feet. The coaxial cable could be, for example, type RG 122/μ. For very short cable lengths, for example 10 feet, the field effect transistor 85 is automatically adjusted to equal the characteristic impedance of the delay line 83, so that the delay line filter has no effect. For long cable lengths, for example 5,000 feet, the field effect transistor 85 resistance is automatically adjusted to a relatively low value so that reflections on the delay line 83 result in a rising response vs. frequency at point 96 to compensate for the loss in high frequency response of the long coaxial cable 78. Thus the automatic equalization circuit adjusts the frequency response of the system so that the waveform of the self-clocking data code is restored to almost the original form at point 96.

Amplifier 90, capacitor 102, choke 101 and field effect transistor 100 comprise a differentiating circuit for taking the leading and trailing edges of the Manchester data at point 96. The resistance of field effect transistor 100 varies as an inverse function at cable length and is controlled in a similar manner to that of field effect transistor 85. Typically, the capacitor 102 is 180 micro-micro-farads, the choke 83 is 10 microhenries and the resistance of the field effect transistor 100 is 150 ohms for 5000 feet of RG 122/μ coaxial cable. The Manchester reconstruction circuit 91 operates from the leading and trailing edges of the manchester data which are present at point 97, and reconstructs the Manchester into logic levels (typically 0 and 5 volts) at point 95. The Manchester decoder 92 extracts the original NRZ(C) data which was supplied by the gain ranging seismic amplifier in the substation. It also extracts the original clock and the space bit. Methods of extracting NRZ(C) data and clock from Manchester are well-known in the art.

Using the circuit of FIG. 5, 2.3 million bits per second have been transmitted over 5,000 feet of RG 122 cable. Since the self-clocking Manchester data has very small audio frequency components, a telephone channel can be frequency division multiplexed between the DC control voltage (supplied by −V, FIG. 5) and the 1 megabit per second Manchester data. Such a telephone channel may occupy the band from, say, 100 Hz. to 3,000 Hz. and may be used at the same time that data is being transmitted over the coaxial cable. In FIG. 5, a microphone and amplifier arrangement 98 is used to multiplex voice communication, along with the DC control voltage and Manchester data, on the coaxial cable. A telephone line receiver, filter, and loudspeaker arrangement 99 is used to receive telephone communication.

The self-clocking data encoder circuit described above combines the digital-data word of the NRZ shown in the FIG. 4 with the clock signal. More particularly, the data encoder circuit transmits one half cycle of a square wave at one half the clock frequency to represent a zero level, and a full square wave cycle of the clock frequency to represent a one level. (Manchester encoding). Other self-clocking codes, such as Return to Zero (RZ), or Miller (U.S. Pat. No. 3,108,261) could also be used. Thus, both the digital data and the clock pulses can be transmitted as a single train of pulses. The self-clocking data encoder also provides suitable identifying breaks or gaps between each digital word so that the signals from the individual geophones can be identified and separated.

Figure 6:
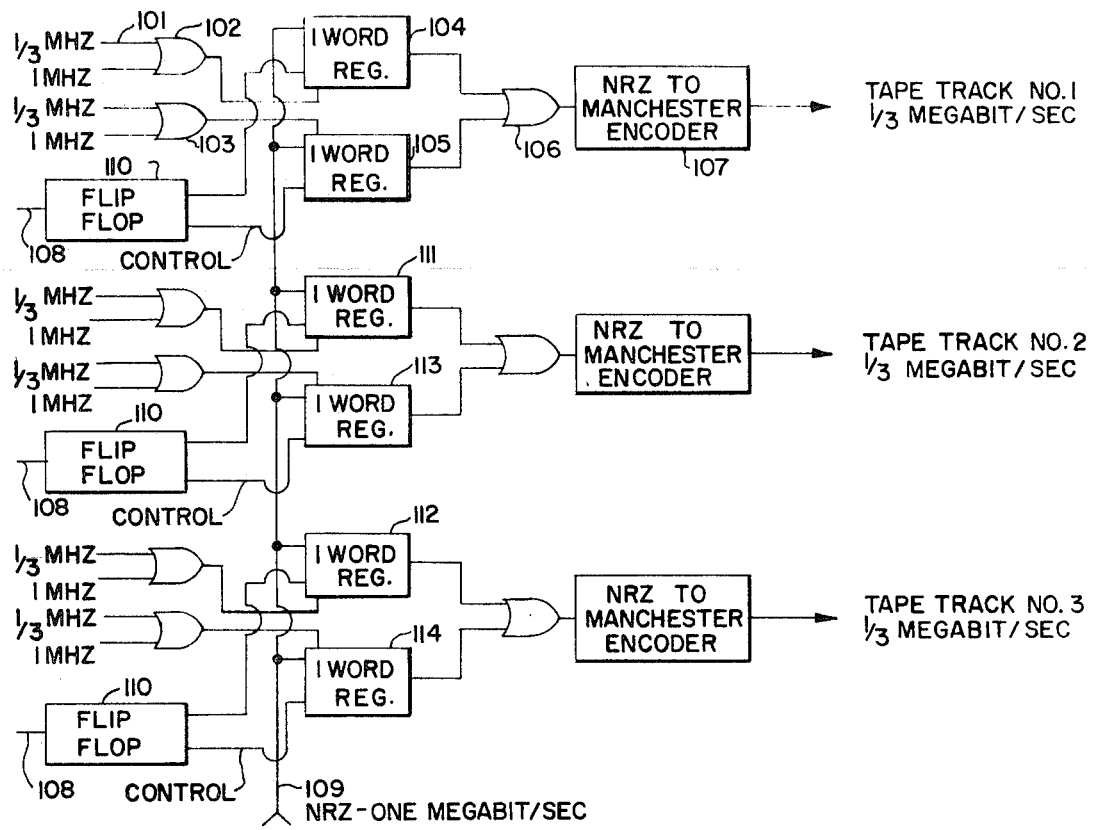
FIG. 6 is a block diagram of the central recording system components.

Referring now to FIG. 6, there is shown in block diagram form the partial dimultiplexor used in the central recording station. More particularly, there are shown three identical circuits each of which converts one series of NRZ encoded geophone signals to a Manchester self-clocking signal for recording on the tape. Since the three circuits are identical in construction, only one circuit will be described in detail. As shown at the top of the drawing, a one-third MHz. signal and a 1 MHz. signal are applied to two NOR GATES 102 and 103 by the leads 101. The NOR GATE 102 is coupled to a one-word shift register 104 while the NOR GATE 103 is coupled to the one-word shift register 105. The shift registers should have the ability to store a 20-bit digital data word corresponding to one value of the geophone signal. Also supplied to the shift register by means of the lead 109 are the data pulses including the gap or space bit which indicates the end of each digital data word. The 1 MHz. and one-third MHz. signals are obtained from the local clock as supplied from the Manchester to NRZ and clock decoder 92 shown in FIG. 5. The shift registers 104 and 105 are controlled so that the digital words are read or loaded into one of the shift registers at the rate of 1 MHz. and are read out or unloaded at a rate of one-third MHz. The shift registers 104 and 105 are controlled by the timing signal on lead 108 and the flip-flop 110. The timing signal is generated in a ring counter from the clock pulse and is designed to activate the shift registers in the proper sequence. Thus, while one of the registers of a pair is being loaded, the other register is being unloaded at one-third MHz. rate. Both of the shift registers are coupled to an OR GATE 106 that controls an NRZ to Manchester Encoder 107. The encoder 107 may be similar to that described above with relation to FIG. 3 and is used to change the data code from NRZ to Manchester Form so that it will be a self-clocking signal which can then be read from the tape by conventional digital processing units. The three encoders shown in FIG. 6 are coupled to three separate tracks on a magnetic tape recorder (not shown) so that the Manchester data can be recorded in a magnetic form.

Figure 7:
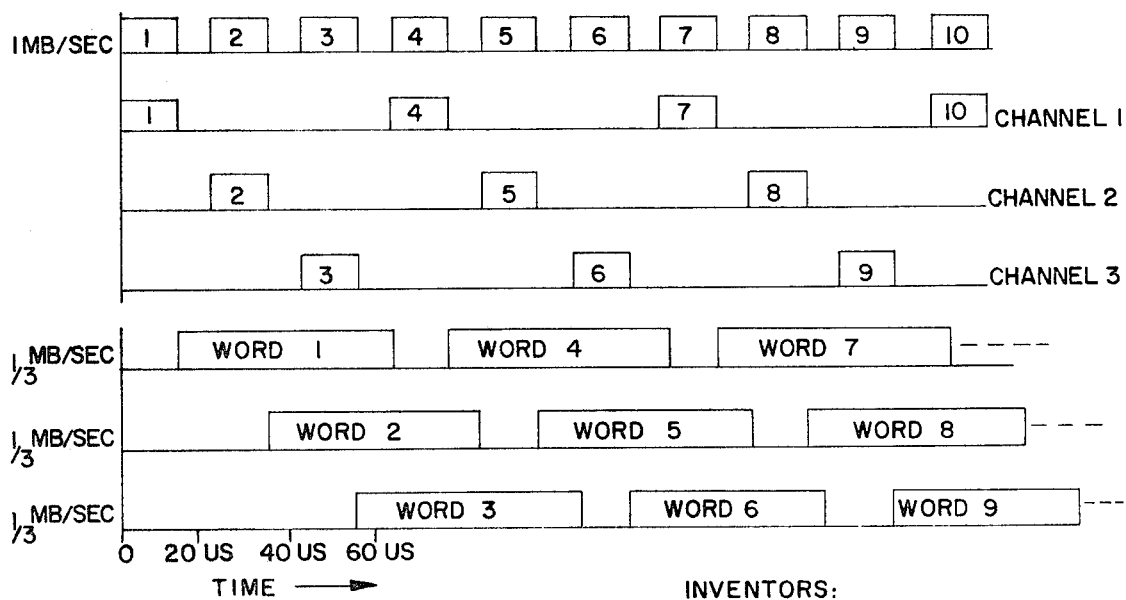
FIG. 7 illustrates the timing diagram for original data and the actual recorded data.

In FIG. 7, there is shown the timing diagram for the partial de-multiplexer. More particularly, at the top there is shown the individual data words 1–10 that are separated by a gap or space bit 120. Next the signals from the three channels are separated into individual groups corresponding to the geophones in a string. The three groups are obtained by means of the circuit 109 which separates the signals 1,4,7 and 10 corresponding to the geophones in one string into channel 1 and the remaining signals 2,3,5,6,8, and 9 into channels 2 and 3. The individual data words are read into the shift registers, for example data word 1 can be read into the shift register 104 while the data words 2 and 3 are read into the shift registers 111 and 112 at a 1 MHz. rate. The data words can then be read out at a one-third MHz. rate while the next data words in each channel, for example, 4,5 and 6 are being read into the shift registers 105, 113 and 114. Then the data can be read out of the registers 105, 113 and 114 at a one-third MHz. rate while the remaining registers are being loaded at a 1-MHz. rate. The process can then be continued until all of the data from each channel of geophones is recorded on the magnetic tape.

The above system is operated by assembling the desired number of subgroups and a central recording station. The electronics of the individual subgroups may be easily transported in a small truck and powered from batteries or the like. Thus, the noise generated by external sound sources will be substantially eliminated. Also, the main recording system is powered from a source having very high sound frequencies beyond the audible range, for example, a gas turbine powered generator or alternator. The individual geophones are placed in any desired pattern or spread and connected to the gain-ranging amplifiers of each substation. Further, the substations are coupled to the central recording system by coaxial cable. It is possible to use over a mile of cable without seriously affecting the quality of the data transmitted, or the recording. After the individual geophones are placed and coupled to the substations and the substations coupled to the central recording system, via coaxial cable, the system is ready for operation. The seismic disturbance can then be detonated and the individual geophone signals recorded. Since the signals are all recorded on a single magnetic tape to a common time base, the subsequent processing of the data will be relatively simple and straightforward. While the use of relatively large seismic disturbances, such as dynamite explosions, is preferable, obviously other types of seismic sources such as continuous vibrators could also be used.

We claim as our invention:

1. A method of digitally recording data from a large number of geophones comprising:
   subdividing said geophones into subgroups each subgroup containing a substantially equal number of geophones;
   sampling amplitude of each geophone signal of each subgroup in a predetermined sequence and converting the sampled amplitudes to digital numbers;
   multiplexing said digital numbers for each geophone in a subgroup and a clock signal to form a single train of self-clocking pulses for each subgroup;
   transmitting the self-clocking pulses to a central recording station;
   partially demultiplexing said self-clocking pulses to separate the train of pulses into a plurality of individual trains;
   stretching the time base of the individual trains; and,
   separately recording each of the individual traces.

2. The method of claim 1 where data and clock signals are transmitted simultaneously over one transmission circuit.

3. A method of digitally recording data from a large number of geophones comprising:
   subdividing said geophones into subgroups, each subgroup containing a substantially equal number of geophones;
   sampling amplitude of each geophone signal of each subgroup in a predetermined sequence and converting the sampled amplitudes to digital numbers;
   multiplexing said digital numbers for each geophone in a subgroup and a clock signal to form a single train of self-clocking pulses for each subgroup;

transmitting the self-clocking pulses over a cable transmission means and through an automatic cable length and cable frequency response compensator to a central recording station;

partially demultiplexing said self-clocking pulses to separate the train of pulses into a plurality of individual trains;

stretching the time base of each of the individual trains; and, separately recording each of the individual traces.

4. The method of claim 1 wherein said digital numbers and clock signal are multiplexed by transmitting one cycle of the clock signal to indicate digital value of one and one half cycle of one half the clock frequency to indicate a digital value of zero.

5. The method of claim 2 wherein said digital numbers are further multiplexed by placing the digital numbers in the same sequence as said geophones are sampled.

6. The method of claim 3 wherein said single train of self-clocking pulses is partially demultiplexed by separating said train into individual trains wherein each individual train includes the digital numbers corresponding to a predetermined group of geophones.

7. The method of claim 4 wherein said geophones are subdivided into subgroups each containing three lines of geophones, said digital numbers being multiplexed by taking the number corresponding to a geophone from each of said three lines in succession and said train of pulses being partially demultiplexed by separating said train of pulses into three separate trains of pulses each of said separate trains containing the digital numbers corresponding to the geophones in one of said three lines, each of said separate trains being recorded as a separate track on a magnetic tape.

8. A system for digitally recording the signals from a large number of geophones, said system comprising:

a substation, said substation including an amplifier having a local clock and sufficient channels to accommodate a group of geophones assigned to said substation and an analog-to-digital converter, said amplifier including means to sample the amplitude of the signal of each geophone in said subgroup in a predetermined order and supply a signal related to said sampled amplitude to said analog-to-digital converter, said substation also including a multiplexing means for combining the digital signal of said analog-to-digital converter and said clock signal into a single train of self-clocking pulses;

a transmission circuit, said transmission circuit being coupled to said substation to transmit said train of self-clocking pulses to a central recording system;

said central recording system including a partial demultiplexing circuit, said partial demultiplexing circuit separating said train of pulses into a plurality of separate trains of pulses, each separate train including signals from a predetermined group of geophones within said subgroup, said partial demultiplexing circuit also including means for stretching the time base of each separate train of pulses; and, a recording means included in said central recording system, and recording means being coupled to said partial demultiplexing circuit and including sufficient recording channels to record each of said separate train of pulses in an individual channel.

9. A system for digitally recording the signals from a large number of geophones, said system comprising:

a substation, said substation including an amplifier having a local clock and sufficient channels to accommodate a group of geophones assigned to said substation and an analog-to-digital converter, said amplifier including means to sample the amplitude of the signal of each geophone in said subgroup in a predetermined order and supply a signal related to said sampled amplitude to said analog-to-digital converter, said substation also including a multiplexing means for combining the digital signal of said analog-to-digital converter and said clock signal into a single train of self-clocking pulses, said multiplexing unit including means to combine the digital signal and clock pulses by utilizing one cycle of said clock pulses to indicate a first digital condition and utilizing one cycle of said clock pulses to indicate a first digital condition and utilizing the one half cycle of the original clock pulse to indicate a second digital condition;

a transmission circuit, said transmission circuit being coupled to said substation to transmit said train of self-clocking pulses to a central recording system;

said central recording system including a partial demultiplexing circuit, said partial demultiplexing circuit separating said train of pulses into a plurality of separate trains of pulses, each separate train including signals from a predetermined group of geophones within said subgroup, said partial demultiplexing circuit also including means for stretching the time base of each separate train of pulses; and, a recording means included in said central recording system, said recording means being coupled to said partial demultiplexing circuit and including sufficient recording channels to record each of said separate train of pulses in an individual channel.

10. The system of claim 8 wherein the geophones assigned to each substation are subdivided into individual groups where each of said individual group corresponds to the geophones disposed along a line and said partial demultiplexing circuit separates said multiplexed signal into individual groups of digital signals corresponding to the individual groups of geophones.

* * * * *